United States Patent
Jamison

(10) Patent No.: US 7,316,415 B2
(45) Date of Patent: Jan. 8, 2008

(54) DUAL CHAMBER AIRBAG

(75) Inventor: Patrick Jamison, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 133 days.

(21) Appl. No.: 10/929,290

(22) Filed: Aug. 30, 2004

(65) Prior Publication Data

US 2006/0043702 A1 Mar. 2, 2006

(51) Int. Cl.
*B60R 21/233* (2006.01)
*B60R 21/16* (2006.01)
*B60R 21/21* (2006.01)

(52) U.S. Cl. .................. 280/729; 280/730.2
(58) Field of Classification Search ............ 280/729, 280/730.2
See application file for complete search history.

(56) References Cited

U.S. PATENT DOCUMENTS

| | | | |
|---|---|---|---|
| 3,843,150 A | 10/1974 | Harada et al. | |
| 5,324,072 A | 6/1994 | Olson et al. | |
| 5,586,782 A | 12/1996 | Zimmerman, II et al. | |
| 5,791,685 A | 8/1998 | Lachat et al. | |
| 5,797,621 A * | 8/1998 | Ono ....................... | 280/730.2 |
| 5,803,485 A | 9/1998 | Acker et al. | |
| 6,059,312 A * | 5/2000 | Staub et al. ............... | 280/729 |
| 6,349,964 B1 | 2/2002 | Acker et al. | |
| 6,916,039 B2 * | 7/2005 | Abe .......................... | 280/729 |
| 6,991,257 B2 * | 1/2006 | Zhao et al. ............... | 280/730.2 |
| 7,168,733 B2 * | 1/2007 | Kumagai et al. ......... | 280/730.2 |
| 7,264,269 B2 * | 9/2007 | Gu et al. .................. | 280/730.2 |
| 2002/0185845 A1 | 12/2002 | Thomas et al. | |
| 2004/0119270 A1 * | 6/2004 | Gu et al. .................. | 280/730.2 |
| 2004/0145162 A1 * | 7/2004 | Abe et al. ................. | 280/729 |
| 2004/0150199 A1 * | 8/2004 | Hofmann .................. | 280/730.2 |

FOREIGN PATENT DOCUMENTS

JP  2003182502 A  *  7/2003
JP  2004210257 A  *  7/2004

* cited by examiner

*Primary Examiner*—Paul N. Dickson
*Assistant Examiner*—Joselynn Y. Sliteris
(74) *Attorney, Agent, or Firm*—Sally J Brown; Stoel Rives LLP

(57) ABSTRACT

A dual chamber airbag cushion is disclosed for use in automotive protective systems. The airbag cushion comprises a first inflatable chamber and a second inflatable chamber disposed adjacent to the first inflatable chamber. In one embodiment, two opposing surfaces defining the second inflatable chamber are attached to one another at a plurality of attachment regions such that, upon inflation of the second chamber, the second chamber has a low profile region corresponding to the location of the attachment regions. An airbag cushion with dual chambers, each of which is inflated to a different pressure upon deployment, is thereby created.

19 Claims, 5 Drawing Sheets

DUAL CHAMBER AIRBAG

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Described below are embodiments of a dual chamber airbag. Although the description below will primarily focus on embodiments used in side airbag systems, as those of skill in the art will appreciate, the principles of the invention may be applied to and used with other similar systems, such as frontal airbag, knee airbag, and overhead airbag systems. Embodiments of the airbag allow for creation of a high pressure chamber and a low pressure chamber. The thickness and location of the various chambers may be adjusted to selectively provide differing levels of protective force to different parts of an occupant's body.

In embodiments of the dual chamber airbag designed for use in side airbag systems, the low pressure chamber may be positioned to deploy adjacent to an occupant and the high pressure chamber may be positioned to deploy adjacent to the door. The high pressure chamber may be configured with a low-profile region which is configured to deploy at approximately the same height as an occupant's rib area. As such, embodiments of the invention may allow for creation of thick high pressure regions in the pelvis and shoulder areas and one or more thinner high pressure regions in the rib area. Such a configuration allows for providing greater protective force in areas of the body where it is needed and where such forces will not injure an occupant and comparatively less force against other more sensitive areas of the body.

Figure 1:
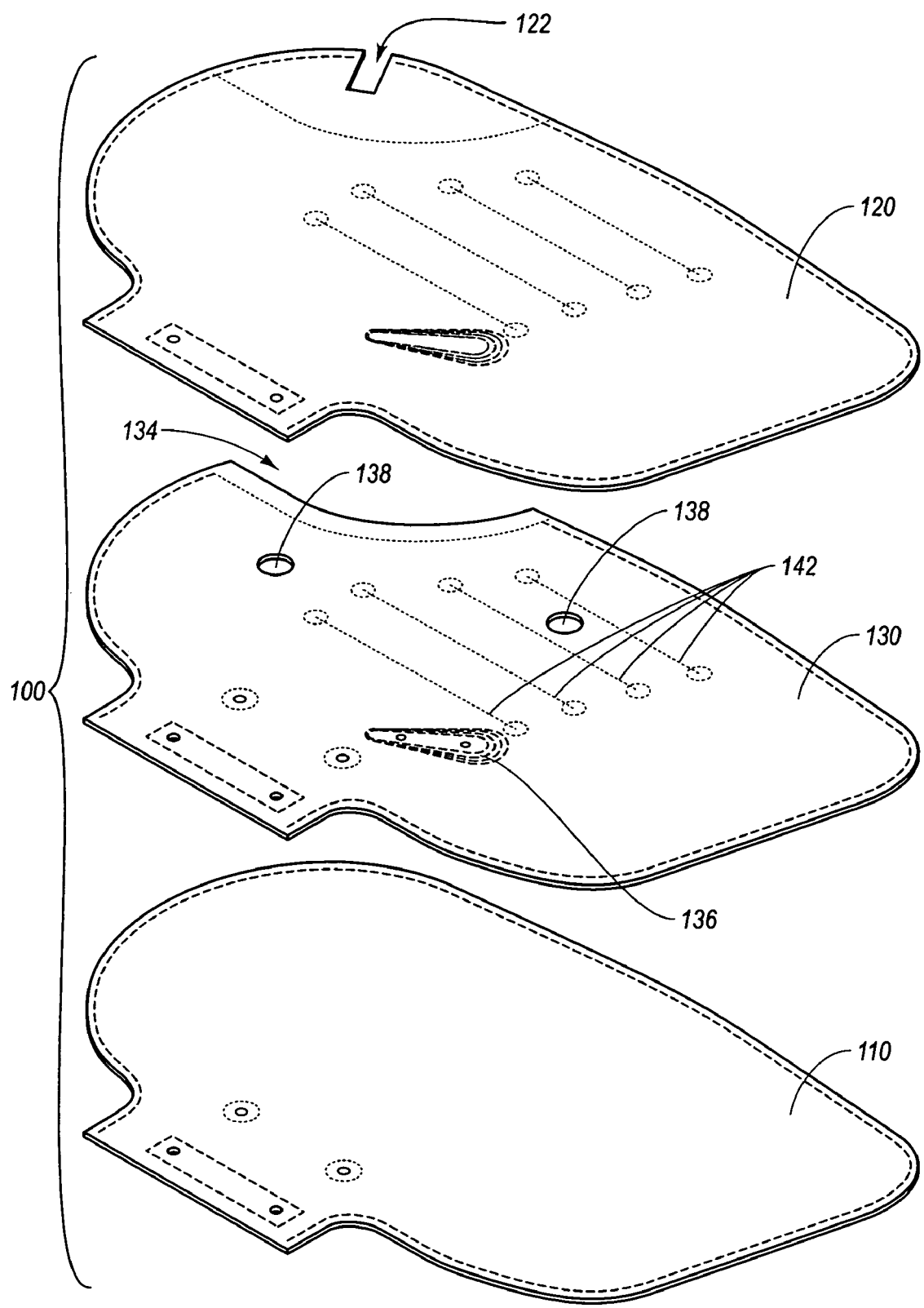
FIG. 1 is an exploded perspective view of a side airbag embodiment of the invention showing its three constituent panels.

With reference now to the accompanying figures, particular embodiments of the invention will now be described in greater detail. FIG. 1 depicts three panels that together comprise a side airbag cushion 100. The first and second—or inboard and outboard—panels 110 and 120, respectively, are attached to one another along their respective perimeters. It should be understood, however, that the outer periphery of the airbag may comprise a single piece of material instead of being made up of the first and second panels as shown in the figures. The panels may be attached to one another by any available technique or methodology, including, for example, stitching, fasteners, welding, bonding, etc. Outboard panel 120 also includes notch 122. Notch 122 may be used to vent inflation gas from the airbag cushion 100 following deployment. As will be apparent from the discussion below, notch 122 vents inflation gas from a low pressure chamber to the ambient environment. Of course, other external vents may be used. For instance, one or more vents may alternatively or additionally be placed in any of the airbag panels to direct inflation gas from a high pressure chamber to the ambient environment. It will, however, typically be the case that vent openings from a high pressure chamber will have a smaller cross-section than those used to vent inflation gas from a low pressure chamber.

A third or middle panel 130 is disposed between the inboard panel 110 and the outboard panel 120. Middle panel 130 in the depicted embodiment generally follows the contours of the perimeter of the inboard and outboard panels with one exception. A portion of the perimeter of middle panel 130 is cut away to form a cutout portion 134. Whereas all three panels are attached to one another along their respective perimeters at the dashed lines in FIG. 1, along the perimeter of cutout portion 134 middle panel 130 is only attached to outboard panel 120, as shown by the dotted line in FIG. 1. All three panels are also attached together at an inflator guide portion 136. It should be understood that the middle panel may be replaced with an inner bag or multiple panels rather than a single panel in some embodiments.

Middle panel 130 is also attached to outboard panel 120 at a plurality of attachment regions. In the depicted embodiment, the attachment regions comprise attachment lines 142. Attachment lines 142 in FIG. 1 are parallel to one another. Attachment lines 142 may comprise sew lines, adhesive lines, weld lines, staple lines or any other similar line for attaching two surfaces together. As alternatives to attachment lines, attachment regions may comprise patched regions or other regions of various shapes and sizes attached by any of the aforementioned or otherwise available attachment methods.

Middle panel 130 has two vent openings 138. Of course, any number of vent openings from one to several may be used in accordance with the desired specifications of the airbag. As will be discussed in greater detail below, vent openings 138 allow for fluid communication in and out of the chamber defined by outboard panel 120 and the middle panel 130. Vent openings may be placed in any desired area of the middle panel 130. One of the vent openings 138 in the depicted embodiment is disposed in between two attachment lines 142.

Figure 2:
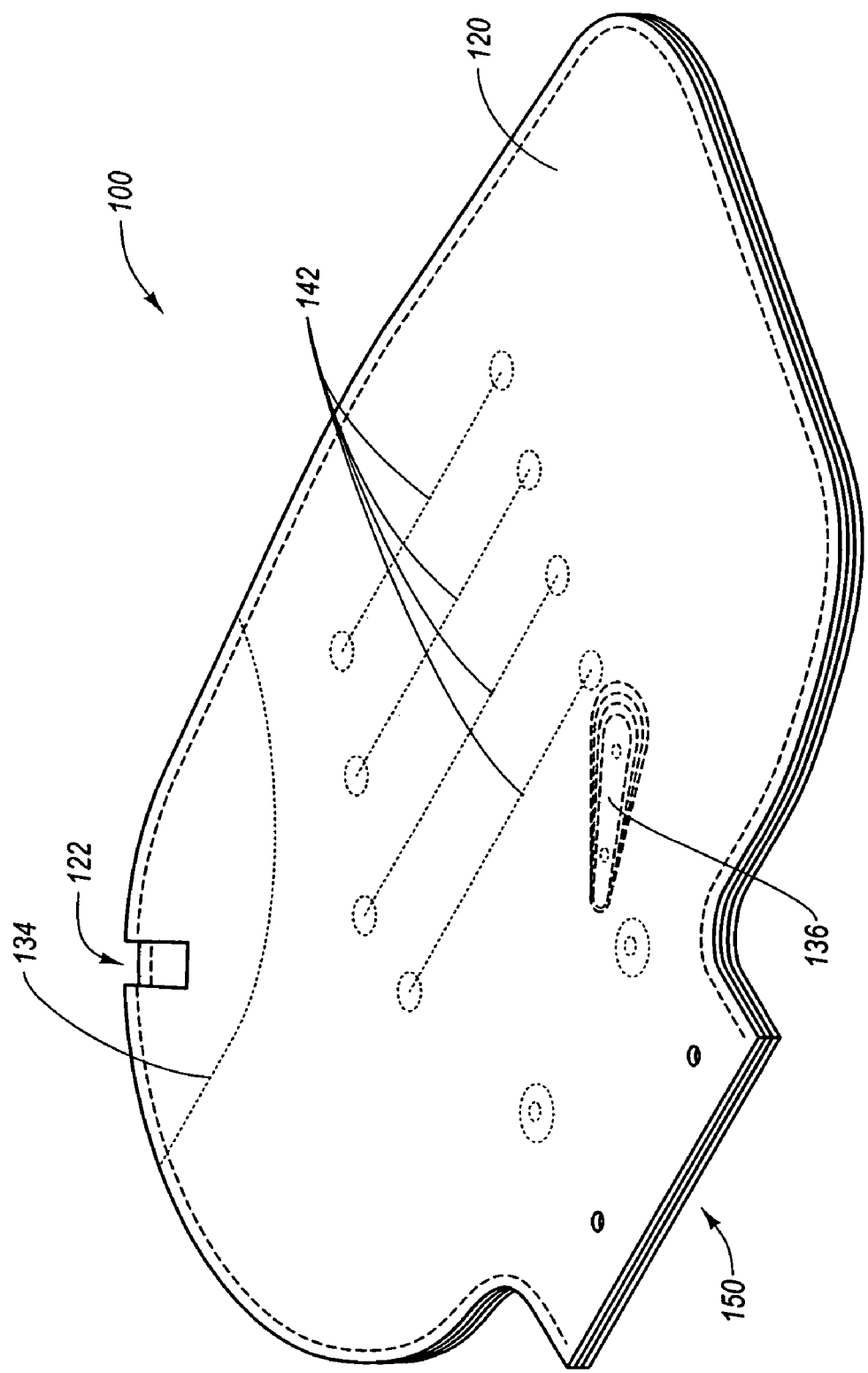
FIG. 2 is a perspective view of the embodiment shown in FIG. 1.
Figure 3A:
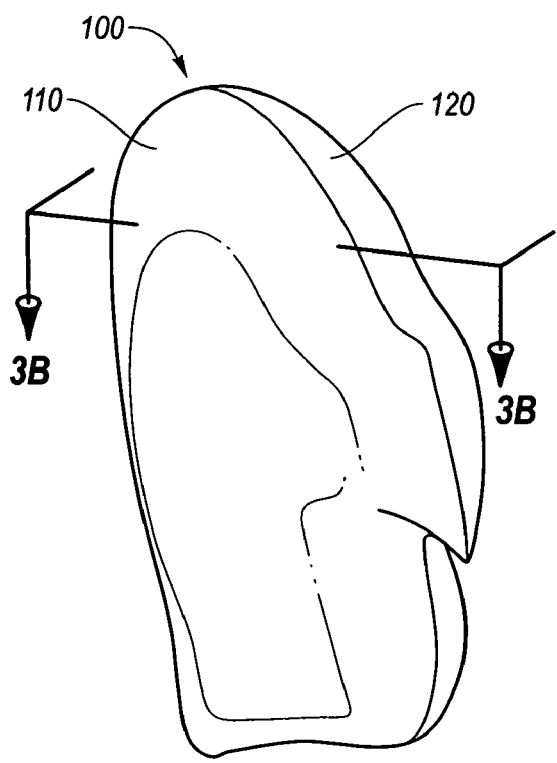
FIG. 3A is a perspective view of an inflated side airbag embodiment of the invention.
Figure 3B:
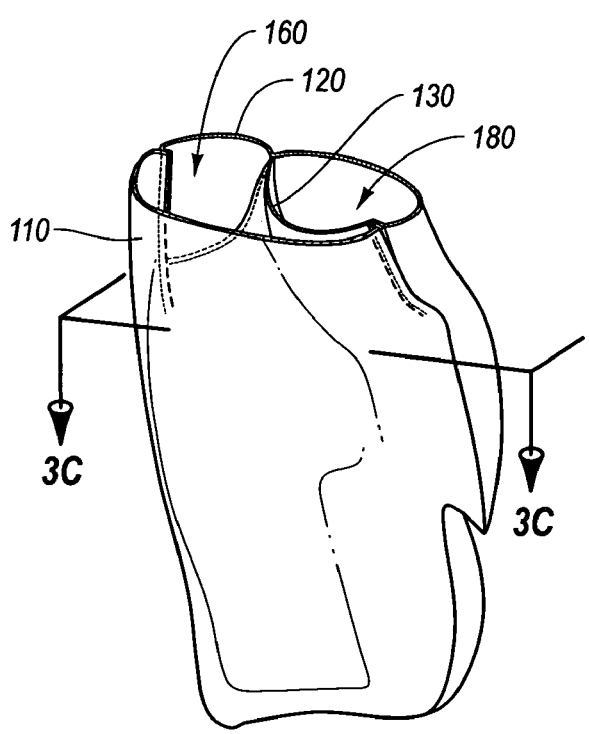
FIG. 3B is a cross-sectional view taken along line 3B-3B in FIG. 3A.
Figure 3C:
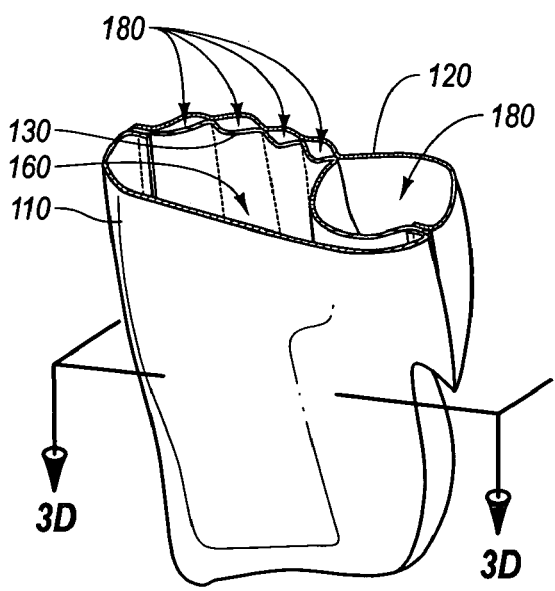
FIG. 3C is a cross-sectional view taken along line 3C-3C in FIG. 3B.
Figure 3D:
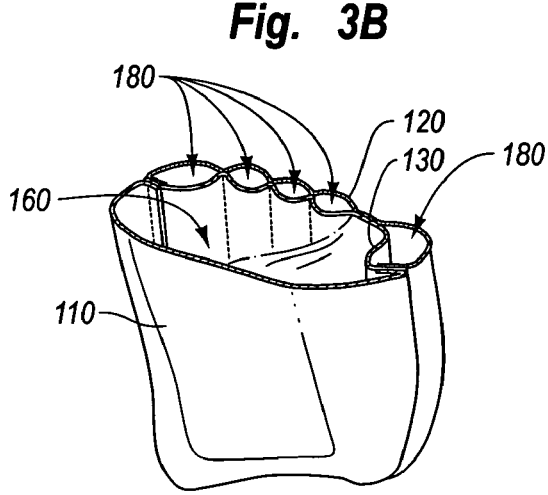
FIG. 3D is a cross-sectional view taken along line 3D-3D in FIG. 3C.

FIG. 2 depicts the side airbag cushion 100 with all three panels—inboard panel 110, outboard panel 120, and middle panel 130—attached to one another. Airbag cushion 100 is shown with the outboard panel 120 side up. Outboard panel 120 is attached to inboard panel 110 along their respective perimeters (with the exception of the inflator opening 150). Outboard panel 120 is attached to middle panel 130 along the perimeter of middle panel 130, which, as discussed above, includes cutout portion 134. Thus, outboard panel 120 is attached to inboard panel along the perimeters of both inboard panel 110 and middle panel 130, which coincide except along cutout portion 134. As mentioned above, outboard panel 120 is also attached to middle panel 130 along attachment lines 142 and is further attached to both other panels at inflator guide portion 136.

With reference now to FIGS. 3A-3D, the airbag cushion 100 will now be discussed further, particularly relative to the dual chambers that are created when the bag is inflated. A first chamber 160 is defined by the inboard panel 110 and the middle panel 130. As will be discussed later, a portion of first chamber 160 may also be defined by the inboard panel 110 and the outboard panel 120. A second chamber 180 is defined by the outboard panel 120 and the middle panel 130.

Figure 4:
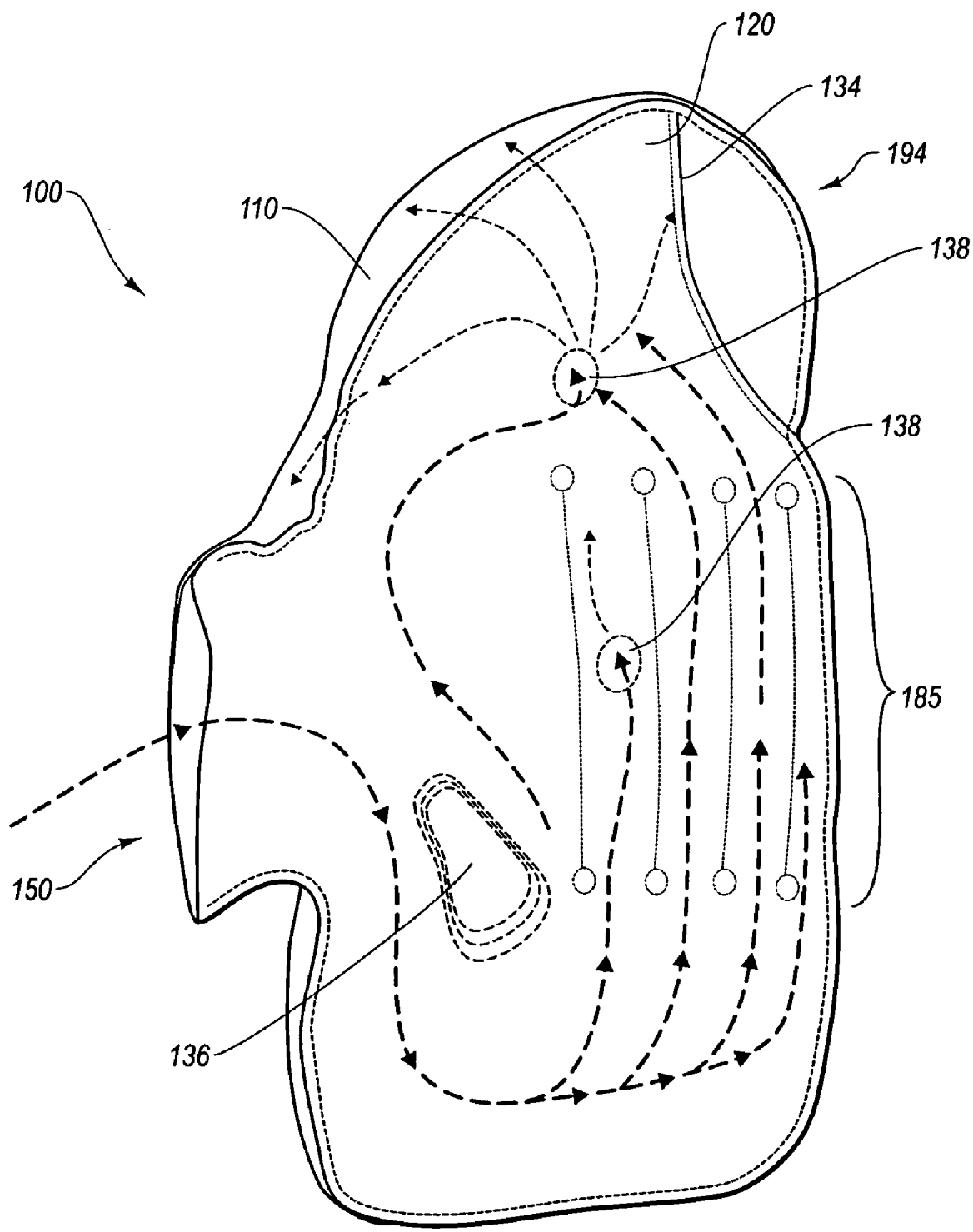
FIG. 4 is a perspective schematic view showing gas flow through a side airbag embodiment of the invention.

As shown schematically in FIG. 4, air from the inflator (not shown) is immediately directed into the second chamber 180. Because second chamber 180 directly receives the inflation gas, it is also referred to herein as a high pressure chamber. Likewise, first chamber 160 is also referred to herein as a low pressure chamber. Upon deployment of the airbag, the pressure from the inflation gas causes the second chamber 180 at the bottom of the airbag to occupy virtually the entire volume of the lower portion of the airbag. Thus, the high pressure is felt almost immediately from the inboard side of the bag.

The middle portion (vertically) of the airbag cushion has a low profile region 185. Low profile region 185 corresponds generally with the portipn of the airbag occupied by the attachment lines 142. Two opposing surfaces defining the high pressure chamber 180 may be attached to one another at a plurality of regions to form the attachment regions. For instance, as discussed above, middle panel 130 may be attached to outboard panel 120 to form the attachment regions.

Attachment lines 142 prevent the surrounding portion of the airbag cushion from fully expanding to occupy the entire volume of the airbag in that region. In the depicted embodiment, inflation gas is allowed to travel from the high pressure chamber 180 to the low pressure chamber 160 through vent openings 138. Note that air flow in high pressure chamber 180 is shown in FIG. 4 with the thicker and longer dashed lines and air flow in the low pressure chamber 160 is shown with the thinner and shorter dashed lines. Thus, the region of low pressure chamber 160 generally adjacent to low profile region 185 is allowed to fill with inflation gas at a lower pressure than the pressure of high pressure chamber 180. The pressure of the airbag in this area is therefore bi-layered. The inboard side of the airbad cushion in this area has immediately adjacent thereto a low pressure portion (part of low pressure chamber 160) of a given thickness, outside of which is the high pressure portion (part of high pressure chamber 180). Thus, an occupant positioned adjacent to the airbag following deployment would first feel the pressure from the low pressure portion in this area, and would only feel the pressure from the high pressure portion secondarily, if at all, following further depression into the airbag cushion. The thickness of the high pressure portion relative to the low pressure portion in this area may be selected by varying the size, location, quantity, and spacing of the attachment regions.

In the top portion of the airbag cushion above the attachment lines 142, the pressure in the second chamber 180 again causes the second chamber 180 in this region to occupy virtually the entire volume of the upper portion of the airbag. Thus, again the high pressure is felt almost immediately at the inboard side of the airbag in this region. High pressure chamber 180 occupies most of the volume of the airbag cushion above and below low profile region 185. High pressure chamber 180 also extends across most of tile surface area of the airbag cushion. For these reasons, it provides a support structure or platform to facilitate stable inflation of the low pressure chamber 160, the majority of the volume of which is positioned in the mid-portion of the airbag cushion adjacent to the low profile region 185.

In the depicted embodiment, because the middle panel 130 is attached to the outboard panel 120 along the perimeter of the cutout portion 134, a low pressure pouch 194 is created. Low pressure pouch 194 is defined by the inboard and outboard panels 110 and 120. One or more low pressure pouches may be included to provide other regions of the airbag cushion in which a lesser deployment force is desired. As shown in FIG. 4, a second vent opening 138 is positioned above the low profile region 185 in order to further facilitate inflation of the low pressure chamber 160, and particularly low pressure pouch 194.

Figure 5:
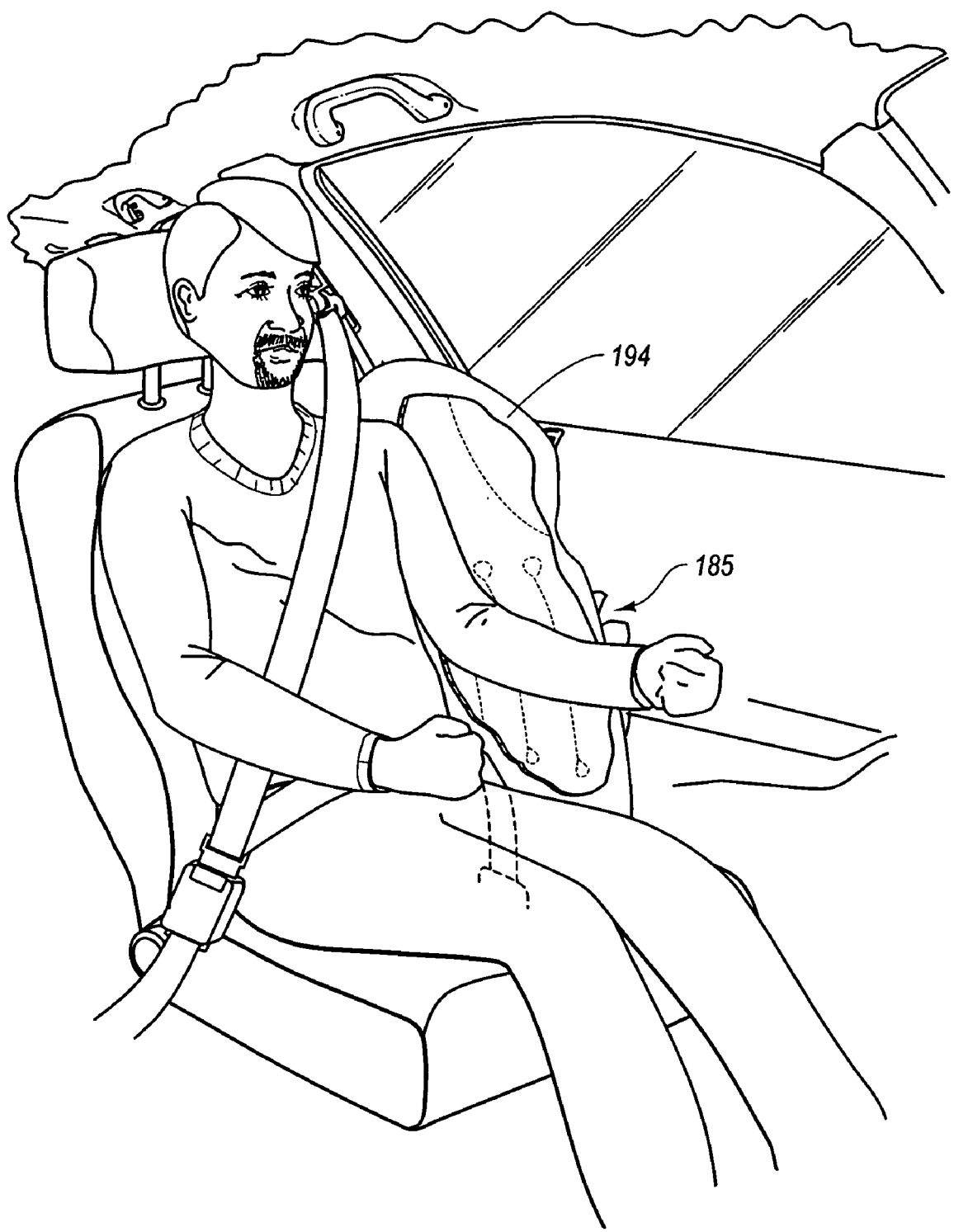
FIG. 5 is a perspective view showing a side airbag embodiment deployed in a vehicle adjacent to an occupant.

As shown in FIG. 5, when the airbag cushion 100 is deployed, low profile region 185 is positioned at approximately the same height as an occupant's rib area. The region above low profile region 185 is positioned at approximately the same height as an occupant's shoulder area. Note that a portion of the airbag cushion is shown broken away in FIG. 5 such that the attachment lines between the middle and outboard panels can be seen. The region below low profile region 185 is positioned at approximately the same height as an occupant's pelvis area. Low pressure pouch 194 is positioned just forward, relative to the occupant's point of view, from the occupant's shoulder area. Thus, if an occupant is positioned in the vehicle with his or her arms extended forward, the arms are cushioned by low pressure pouch 194 instead of by a portion of the high pressure chamber 180. Embodiments of the invention may therefore allow for selective creation of high pressure areas and low pressure areas of desired thicknesses in order to selectively provide varying amounts of protective force to different parts of an occupant's body.

It will be obvious to those having skill in the art that many changes may be made to the details of the above-described embodiments without departing from the underlying principles of the invention. The scope of the present invention should, therefore, be determined only by the following claims.

The invention claimed is:

1. An airbag cushion assembly, comprising:
   a first panel;
   a second panel attached to the first panel; and
   a third panel disposed between the first and second panels, wherein the first and third panels define a first chamber and the second and third panels define a second chamber, wherein the third panel is attached to the second panel at a plurality of attachment regions such that, upon inflation of the second chamber, the second chamber has a low profile region corresponding to the location of the attachment regions, and wherein the third panel has a cutout portion formed therein, wherein the cutout portion does not match the perimeter of the second panel, and wherein the third panel is attached to the second panel along the perimeter of the cutout portion such that a portion of the first chamber is defined by the first and second panels.

2. The airbag cushion assembly of claim 1, wherein at least one of the attachment regions comprises an attachment line.

3. The airbag cushion assembly of claim 2, wherein the attachment regions comprise a plurality of attachment lines.

4. The airbag cushion assembly of claim 3, wherein the plurality of attachment lines are substantially parallel to one another.

5. The airbag cushion assembly of claim 1, wherein the third panel has at least one opening formed therein to allow fluid communication between the first and second chambers.

6. The airbag cushion assembly of claim 5, wherein at least one opening is formed in between two attachment regions.

7. The airbag cushion assembly of claim 1, wherein the airbag cushion assembly is designed to be used as a side impact airbag cushion, and wherein the airbag cushion assembly is configured such that the low profile region will be positioned at approximately the same height as an occupant's rib area upon deployment of the airbag.

8. The airbag cushion assembly of claim 1, wherein the second chamber is configured to be a high pressure chamber, wherein the first chamber is configured to be a low pressure chamber, and wherein the high pressure chamber serves as a support structure to facilitate stable deployment of the low pressure chamber.

9. An airbag cushion assembly designed to be used in side impact airbag system, the airbag cushion assembly comprising:
a first inflatable chamber configured to be inflated adjacent to an occupant at an inboard side of the side airbag cushion assembly; and
a second inflatable chamber positioned adjacent to the first inflatable chamber and configured to be inflated adjacent to a vehicle door at an outboard side of the side airbag cushion assembly, wherein the second inflatable chamber is configured to receive an inflator, wherein two opposing surfaces defining the second inflatable chamber are attached to one another at a plurality of attachment regions such that, upon inflation of the second chamber, the second chamber has a low profile region corresponding to the location of the attachment regions, wherein the attachment regions comprise a plurality of attachment lines that are configured to direct inflation gas between a bottom portion of the second inflatable chamber and a top portion of the second inflatable chamber, wherein the second chamber has a cutout portion formed therein, and wherein, upon deployment of the airbag, the cutout portion allows for the formation of a low pressure pouch in the first chamber, and wherein the second inflatable chamber has at least one opening formed therein to direct fluid communication from the second chamber to one or more selected regions of the first chamber such that, upon deployment of the inflator, the second inflatable chamber is inflated to a pressure and the first inflatable chamber is inflated to a pressure, wherein the second chamber pressure is greater than the first chamber pressure.

10. The airbag cushion assembly of claim 9, wherein the plurality of attachment lines are substantially parallel to one another.

11. The airbag cushion assembly of claim 9, wherein at least one opening is formed in between two attachment regions.

12. The airbag cushion assembly of claim 9, wherein the airbag assembly is configured such that the low profile region will be positioned at approximately the same height as an occupant's rib area upon deployment of the airbag.

13. The airbag cushion assembly of claim 9, wherein the first inflatable chamber comprises at least two panels sewn together along the panels' respective peripheries.

14. A side-impact airbag cushion assembly, comprising:
a first panel;
a second panel attached to the first panel; and
a third panel disposed between the first and second panels, wherein the first and third panels define a first chamber and the second and third panels define a second chamber, wherein the first chamber is configured to be inflated adjacent to an occupant at an inboard side of the side-impact airbag cushion assembly, wherein the second chamber is configured to be inflated adjacent to a vehicle door at an outboard side of the side airbag cushion assembly, wherein the third panel is attached to the second panel at a plurality of attachment lines such that, upon inflation of the second chamber, the second chamber has a low profile region corresponding to the location of the attachment lines, wherein at least a portion of at least one of the attachment lines is configured to be positioned at the same height as an occupant's rib area upon deployment of the airbag, wherein the third panel has at least one opening formed therein to direct fluid communication from the second chamber to one or more selected regions of the first chamber, wherein the second chamber is configured to be a high pressure chamber, wherein the first chamber is configured to be a low pressure chamber, and wherein the high pressure chamber serves as a support structure to facilitate stable deployment of the low pressure chamber, wherein the third panel has a cutout portion formed therein that does not match the perimeter of the second panel, and wherein the third panel is attached to the second panel along the perimeter of the cutout portion such that a portion of the low pressure chamber is defined by the first and second panels.

15. The side-impact airbag cushion assembly of claim 14, wherein the first and second panels are exterior panels, and wherein the third panel is a middle panel.

16. A side-impact airbag cushion assembly, comprising:
a first panel;
a second panel attached to the first panel; and
a third panel disposed between the first and second panels, wherein the first and third panels define a first chamber and the second and third panels define a second chamber, wherein the first chamber and the second chamber each extend from substantially the top of the airbag cushion to substantially the bottom of the airbag cushion, wherein the airbag cushion is configured such that the second chamber receives an inflator and is adapted to be inflated to a greater pressure than the first chamber, and wherein the second chamber is adapted to inflate adjacent to a door and the first chamber is adapted to inflate adjacent to an occupant, and wherein the second chamber has a cutout portion formed therein, and wherein, upon deployment of the airbag, the cutout portion allows for the formation of a low pressure pouch in the first chamber.

17. The side-impact airbag cushion assembly of claim 16, wherein the second chamber has a low profile region wherein the inflated first chamber is thicker than the inflated second chamber.

18. The side-impact airbag cushion assembly of claim 16, wherein the third panel has at least one opening formed therein to allow fluid communication between the first and second chambers.

19. The side-impact airbag cushion assembly of claim 16, further comprising an inflator positioned at least partially within the second chamber.

* * * * *